US008660982B1

(12) United States Patent
Adams et al.

(10) Patent No.: US 8,660,982 B1
(45) Date of Patent: Feb. 25, 2014

(54) MEASURING MARGINAL INFLUENCE OF A FACTOR IN A DECISION

(75) Inventors: William James Louis Adams, DeLand, FL (US); Daniel Lowell Saaty, Falls Church, VA (US)

(73) Assignee: Decision Lens, Inc., Arlington, VA (US)

( * ) Notice: Subject to any disclaimer, the term of this patent is extended or adjusted under 35 U.S.C. 154(b) by 0 days.

(21) Appl. No.: 13/611,544

(22) Filed: Sep. 12, 2012

Related U.S. Application Data

(63) Continuation of application No. 12/646,418, filed on Dec. 23, 2009, now Pat. No. 8,315,971, and a continuation of application No. 12/646,289, filed on Dec. 23, 2009, now Pat. No. 8,423,500.

(51) Int. Cl.
*G06F 15/00* (2006.01)
*G06F 15/18* (2006.01)

(52) U.S. Cl.
USPC .......................................................... 706/62

(58) Field of Classification Search
USPC .............................................. 706/62, 46, 45
See application file for complete search history.

(56) References Cited

U.S. PATENT DOCUMENTS

| | | | |
|---|---|---|---|
| 5,844,817 A | 12/1998 | Lobley et al. | |
| 6,151,565 A | 11/2000 | Lobley et al. | |
| 6,502,126 B1 | 12/2002 | Pendakur | |
| 6,643,645 B1 | 11/2003 | Fayyad et al. | |
| 6,785,709 B1 | 8/2004 | Pendakur | |
| 6,850,891 B1 * | 2/2005 | Forman | 705/7.11 |
| 6,882,989 B2 | 4/2005 | Stevens | |
| 6,907,566 B1 | 6/2005 | McElfresh et al. | |
| 6,963,901 B1 | 11/2005 | Bates et al. | |
| 7,080,071 B2 | 7/2006 | Henrion et al. | |
| 7,203,755 B2 | 4/2007 | Zhu et al. | |
| 7,257,566 B2 | 8/2007 | Danielson et al. | |
| 7,353,253 B1 | 4/2008 | Zhao | |
| 7,398,257 B2 | 7/2008 | Kaji | |
| 7,542,952 B2 | 6/2009 | Yang et al. | |

(Continued)

FOREIGN PATENT DOCUMENTS

| | | |
|---|---|---|
| WO | WO 01/08070 A1 | 2/2001 |
| WO | WO 01/20530 A1 | 3/2001 |
| WO | WO 2008/057178 A2 | 5/2008 |
| WO | WO 2009/026589 A3 | 2/2009 |

OTHER PUBLICATIONS

Demirtas et al, "An integrated multiobjective decision making process for supplier selection and order allocation", Department of Industrial Engineering, Osmangazi University, 26030 Eskisehir, Turkey, Available online Feb. 28, 2006.*

(Continued)

*Primary Examiner* — Jeffrey A Gaffin
*Assistant Examiner* — Ilya Traktovenko
(74) *Attorney, Agent, or Firm* — Posz Law Group, PLC

(57) ABSTRACT

An apparatus includes an analytic network process (ANP) storage memory that stores an ANP weighted supermatrix representing an ANP model; and a processor in communication with the ANP storage memory. The processor is configured to facilitate measuring an instantaneous rate of change of alternative scores with respect to a fixed node of the ANP model, to determine a marginal influence of the fixed node. Also, the processor is configured to facilitate maintaining a same proportionality in the stored ANP weighted supermatrix as an importance of the fixed node is changed to measure the instantaneous rate of change.

24 Claims, 5 Drawing Sheets

(56) References Cited

U.S. PATENT DOCUMENTS

| | | | |
|---|---|---|---|
| 7,552,104 | B2 | 6/2009 | Hansen et al. |
| 7,624,069 | B2 | 11/2009 | Padgette |
| 7,689,592 | B2 | 3/2010 | Denton et al. |
| 7,716,360 | B2 | 5/2010 | Angelov |
| 7,827,239 | B2 | 11/2010 | Bodin et al. |
| 7,844,670 | B2 | 11/2010 | Roskowski et al. |
| 7,996,344 | B1 | 8/2011 | Goel |
| 8,239,338 | B1 | 8/2012 | Adams et al. |
| 8,250,007 | B2 | 8/2012 | Abido et al. |
| 8,315,971 | B1 | 11/2012 | Adams et al. |
| 8,341,103 | B2 | 12/2012 | Adams et al. |
| 8,423,500 | B1 | 4/2013 | Adams et al. |
| 8,429,115 | B1 | 4/2013 | Adams et al. |
| 8,447,820 | B1 | 5/2013 | Gay |
| 2001/0027455 | A1 | 10/2001 | Abulleil et al. |
| 2003/0069868 | A1 | 4/2003 | Vos |
| 2003/0191726 | A1 | 10/2003 | Kirshenbaum |
| 2003/0208514 | A1 | 11/2003 | Yang et al. |
| 2004/0103058 | A1* | 5/2004 | Hamilton ............... 705/38 |
| 2006/0195441 | A1 | 8/2006 | Julia et al. |
| 2006/0224530 | A1 | 10/2006 | Riggs et al. |
| 2006/0241950 | A1 | 10/2006 | Hansen et al. |
| 2007/0226295 | A1 | 9/2007 | Haruna et al. |
| 2008/0103880 | A1* | 5/2008 | Saaty ................... 705/12 |
| 2008/0104058 | A1 | 5/2008 | Billmaier et al. |
| 2008/0250110 | A1 | 10/2008 | Zhao |
| 2008/0256054 | A1* | 10/2008 | Saaty ................... 707/5 |
| 2010/0153920 | A1 | 6/2010 | Bonnet |
| 2010/0318606 | A1 | 12/2010 | Sethi et al. |
| 2011/0022556 | A1 | 1/2011 | Adams |
| 2012/0053973 | A1 | 3/2012 | Elazouni et al. |
| 2012/0133727 | A1 | 5/2012 | Bolduc et al. |
| 2013/0046718 | A1 | 2/2013 | Saaty et al. |

OTHER PUBLICATIONS

Tuzkaya et al, "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.*

Adams et al, "Super Decisions Software Guide", Copyright c 1999/2003 Thomas L. Saaty (The software for the Analytic Network Process for decision making with dependence and feedback was developed by William Adams in 1999-2003).*

Neaupane et al, "Analytic network process model for landslide hazard zonation", Civil Engineering Program, Sirindhorn Int. Ins. of Technology, Thammasat University, Thailand, Available online May 2, 2006.*

T.L.Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.*

R.W.Saaty, "Validation Examples for the Analytic Hierarchy Process and Analytic Network Process", MCDM 2004, Whistler, B. C. Canada Aug. 6-11, 2004.*
OfferedToPublic_12646418.*

U.S. Appl. No. 12/646,289, filed Dec. 23, 2009, Adams.
U.S. Appl. No. 12/646,312, filed Dec. 23, 2009, Adams.
U.S. Appl. No. 12/646,418, filed Dec. 23, 2009, Adams.
U.S. Appl. No. 13/015,754, filed Jan. 28, 2011, Ryan Patrick Gay.
U.S. Appl. No. 13/290,423, filed Nov. 7, 2011, Adams.
U.S. Appl. No. 13/294,369, filed Nov. 11, 2011, Adams.

Super Decisions Software for Decision Making, Super Decisions Website, (http://web.archive.org/web/20041202040911/http://www.superdecisions.com/ and http://www.superdecisions.com/~saaty/), 2004.

The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.

The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.

Decision Lens Inc., Decision Lens's Decision Lens Suite™ Product, (http://web.archive.org/web/20050204181100/www.decisionlens.com/index.php), 2004-2005.

Caterinicchia, Dan, "A problem-solving machine," *Federal Computer Week*, (Sep. 4, 2000), 14, 31, p. 48-49.

The Super Decisions Software, The Analytic Network Process, Decision Making with Dependence and Feedback, (http://www.superdecisions.com/~saaty/Fall2005DecisionClass/Powerpoint Slides/), Sep. 2005.

Mikhailov et al., "Fuzzy Analytic Network Process and its Application to the Development of Decision Support Systems," IEEE Transactions on Systems, Man, and Cybernetics—Part C: Applications and Reviews, (Feb. 2003), vol. 33, No. 1, p. 33-41.

Decision Lens, Inc., Tutorial on Hierarchical Decision Models (AHP), 2002.

Decision Lens, Inc., Tutorial on Complex Decision Models (ANP), 2002.

Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.

Rozann W. Saaty., Decision Making in Complex Environments: The Analytic Network Process (ANP) for Dependence and Feedback Including a Tutorial for the SuperDecisions Software and Portions of the Encyclicon of Application, 2005.

Decision Lens, Inc., *MS_Help_Decision_Lens*. "Welcome to Decision Lens Software™," Jun. 6, 2005.

Team Acuity, SAGD ANP Enhancement Functional Requirements Document, (Dec. 15, 2007), p. 1-68.

Decision Lens, Inc., *DLW_Help File*, Dec. 2007.

Decision Lens, Inc., *DLS_Help File*, Dec. 2007.

H. Sun., "AHP in China," International Symposium on the Analytic Hierarchy Process, (Jul. 8-10, 2003), p. 1-21.

Thomas L. Saaty., "Decision-Making with the AHP: Why is the Principal Eigenvector Necessary," International Symposium on the Analytic Hierarchy Process, (Aug. 2-4, 2001), p. 1-14.

Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.

Davolt, Steve, "The man who knew too much," *Washington Business Journal*, (Aug. 7, 2007), (http://www.bizjournals.com/washington/stories/2000/08/07/smallbl.html?t=printable).

Roxann Saaty et al., "Decision Making in complex environments," Super Decisions, 2003.

Feglar et al., "Dynamic Analytic Network Process: Improving Decision Support for Information and Communication Technology," ISAHP, Honolulu, Hawaii, (Jul. 8-10, 2003).

Borenstein et al., "A Multi-Criteria Model for the Justification of IT Investments," (Feb. 2005), INFOR v3n1, Canadian Operational Research Society, p. 1-21.

Condon et al., "Visualizing group decisions in the analytic hierarchy process," *Computers & Operation Research*, (2003), 30, p. 1435-1445.

D. Saaty et al., "The Future of the University of Pittsburgh Medical Center: Strategic Planning with the Analytic Network Process," Proceedings of the Fourth International Symposium on the Analytic Hierarchy Process, (Jul. 12-15, 1996), p. 107-121.

Liming Zhu, et al., "Tradeoff and Sensitivity Analysis in Software Architecture Evaluation Using Analytic Hierarchy Process," *Software Quality Journal*, (2005), vol. 13, pp. 357-375.

Wolfslehner, Bernhard, Vacik, Harald, Lexer, Manfred; "Application of the analytic network process in multi-criteria analysis of sustainable forest management", Forest Ecology and Management, Mar. 2005, pp. 157-170.

Notification of Transmittal of the International Search Report and the Written Opinion of the International Searching Authority mailed Aug. 25, 2008 in corresponding PCT application No. PCT/US2007/022184 in connection with related U.S. Appl. No. 11/586,557.

(56) References Cited

OTHER PUBLICATIONS

Notification of Transmittal of the International Preliminary Report on Patentability mailed May 7, 2009 in corresponding PCT application No. PCT/US2007/022184 in connection with related U.S. Appl. No. 11/586,557.
Office Action issued by the U.S. Patent Office on Aug. 5, 2008 in connection with related U.S. Appl. No. 11/586,557.
Office Action issued by the U.S. Patent Office on Apr. 14, 2009 in connection with related U.S. Appl. No. 11/586,557.
Office Action issued by the U.S. Patent Office on Apr. 13, 2009 in connection with related U.S. Appl. No. 11/783,436.
Office Action issued by the U.S. Patent Office on Oct. 21, 2009 in connection with related U.S. Appl. No. 11/783,436.
Office Action issued by the U.S. Patent Office on Mar. 15, 2012 in connection with parent U.S. Appl. No. 12/646,099.
Notice of Allowance issued by the U.S. Patent Office on Apr. 17, 2012 in connection with parent U.S. Appl. No. 12/646,099.
Demirtas et al., "An integrated multiobjective decision making process for supplier selection and order allocation", Department of Industrial Engineering, Osmangazi University, 26030 Eskisehir, Turkey, Available online Feb. 28, 2006.
Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.
Adams et al., "Super Decisions Software Guide", Copyright c 1999/2003 Thomas L. Saaty (The software for the Analytic Network Process for decision making with dependence and feedback was developed by William Adams in 1999-2003).
Neaupane et al., "Analytic network process model for landslide hazard zonation", Civil Engineering Program, Sirindhorn Int. Ins. of Technology, Thammasat University, Thailand, Available online May 2, 2008.
T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.

R.W. Saaty, "Validation Examples for the Analytic Hierarchy Process and Analytic Network Process", MCDM 2004, Whistler, B. C. Canada Aug. 6-11, 2004.
Office Action issued by the U.S. Patent Office on May 29, 2012 in connection with related U.S. Appl. No. 12/646,418.
Office Action issued by the U.S. Patent Office on Jul. 18, 2012 in connection with related U.S. Appl. No. 12/508,703.
Notice of Allowance issued by the U.S. Patent Office on Aug. 1, 2012 in connection with related U.S. Appl. No. 12/646,418.
Office Action issued by the U.S. Patent Office on Aug. 6, 2012 in connection with related U.S. Appl. No. 12/646,289.
Office Action issued by the U.S. Patent Office on Aug. 10, 2012 in connection with related U.S. Appl. No. 12/646,312.
Notice of Allowance issued by the U.S Patent Office on Aug. 31, 2012 in connection with related U.S. Appl. No. 12/508,703.
Notice of Allowance issued by the U.S. Patent Office on Aug. 31, 2012 in connection with related U.S. Appl. No. 12/508,703.
Office Action issued by the U.S. Patent Office on Nov. 6, 2012 in connection with related U.S. Appl. No. 13/015,754.
Buyukyazici et al. "The Analytic Hierarchy and Analytic Network Processes", Hacettepe Journal of Mathematics and Statistics, vol. 32, 2003, pp. 65-73.
Notice of Allowance issued by the U.S. Patent Office on Jun. 18, 2013 in connection with related U.S. Appl. No. 13/657,926.
Notice of Allowance issued by the U.S. Patent Office on Aug. 2, 2013 in related U.S. Appl. No. 13/290,423.
Office Action dated Aug. 1, 2013 in related U.S. Appl. No. 13/764,010.
Rafiei, et al., Project Selection Using Fuzzy Group Analytic Network Process, World Academy of Science, Engineering and Technology 34 2009, pp. 457-461.
Notice of Allowance issued by the U.S. Patent Office on Dec. 26, 2012 in connection with related U.S. Appl. No. 12/646,289.
Notice of Allowance issued by the U.S. Patent Office on Jan. 3, 2013 in connection with related U.S. Appl. No. 12/646,312.
Notice of Allowance issued by the U.S. Patent Office on Jan. 29, 2013 in connection with related U.S. Appl. No. 13/015,754.
U.S. Appl. No. 13/764,010, filed Feb. 11, 2013, Adams et al.
U.S. Appl. No. 13/764,810, filed Feb. 12, 2013, Adams et al.
U.S. Appl. No. 13/799,077, filed Mar. 13, 2013, Adams.
U.S. Appl. No. 13/834,461, filed Mar. 15, 2013, Saaty et al.

\* cited by examiner

MEASURING MARGINAL INFLUENCE OF A FACTOR IN A DECISION

CROSS-REFERENCE TO RELATED APPLICATION

This application claims the benefit of U.S. application Ser. No. 12/646,418, filed Dec. 23, 2009, titled "MEASURING MARGINAL INFLUENCE OF A FACTOR IN A DECISION," and U.S. application Ser. No. 12/646,289, filed Dec. 23, 2009, titled "MEASURING SENSITIVITY OF A FACTOR IN A DECISION", which are herein incorporated by reference in their entirety.

TECHNICAL FIELD

The present invention relates in general to measuring, and more specifically to measuring impact of factors in a decision.

BACKGROUND

The factors in a decision can be represented and quantified in an analytic hierarchy process (AHP) model. The AHP model can be used to relate the factors to overall goals, and to evaluate alternative solutions. Measuring sensitivity of factors in AHP trees is generally known. For example, as a result of the measurements of sensitivity of nodes in the tree context, a user can get a general idea of how influential individual nodes are, such as how sensitive the decision model's alternative scores are to changes in weight of various nodes in the AHP tree. Measuring sensitivity of the factors in a decision can be straightforward in the AHP tree because the AHP model uses a tree structure.

The factors in a decision also can be represented and quantified in an analytic network process (ANP) model. A process of decision making using an ANP model serves to break down large decisions into smaller, manageable decisions. When a decision is represented as a typical ANP model, nodes in the ANP model can be connected to each other without regard for hierarchy level so as to represent the interrelationship between the smaller decisions. The connections that represent the effect of smaller decisions can be synthesized to arrive at the ultimate decision. Measuring an impact of a factor in a decision quantified in the ANP model is consequently difficult since the ANP is not a simple tree structure and a change in one factor affects interrelated decisions and may (or may not) affect the ultimate decision.

SUMMARY

Accordingly, one or more embodiments provide an apparatus having an analytic network process (ANP) storage memory that stores an ANP weighted supermatrix representing an ANP model; and a processor in communication with the ANP storage memory. The processor can be configured to facilitate measuring an instantaneous rate of change of alternative scores with respect to a fixed node of the ANP model, to determine a marginal influence of the fixed node; and maintaining a same proportionality in the stored ANP weighted supermatrix as an importance of the fixed node is changed to measure the instantaneous rate of change.

According to another embodiment, the measuring of the instantaneous rate of change can include calculating the alternative scores of the fixed node using a changed importance of the node; and calculating the change in the calculated alternative scores over an amount by which the importance of the fixed node was changed.

In still other embodiments, the marginal influence is measured as a length of a vector of the change in the alternative scores.

Another embodiment further includes synthesizing the alternative scores of the fixed node from the alternative scores of the fixed node in an induced family of ANP models formed by row perturbations of the fixed node in the stored ANP weighted supermatrix.

In still other embodiments, the marginal influence is determined consistent with at least one of the formulas:
an upper marginal influence of node r on alternative i is $$s'^{+}_{r,i} = \lim_{h \to 0+} \frac{s_{r,i}(p_0 + h) - s_{r,i}(p_0)}{h};$$

and
a lower marginal influence of node r on alternative i is $$s'^{-}_{r,i} = \lim_{h \to 0-} \frac{s_{r,i}(p_0 + h) - s_{r,i}(p_0)}{h};$$

where r is the fixed node,
i is the alternative which is scored,
$s'^{+}_{r}$ is a total upper marginal influence vector,
$s'^{-}_{r}$ is a total lower marginal influence vector,
h is a "predetermined amount" by which the importance of the fixed node was changed,
$p_0$ is a parameter value which represents returning the node importance to an original weight.
"h" is a predetermined amount initially, and to compute the limit, values of h closer and closer to zero either from above (for 0+) or below (for 0−) can be scaled to approach zero and can be plugged in.

A still further embodiment includes an output unit in communication with the processor and configured to output, for a display to a user, the determined marginal influence.

Yet another embodiment includes an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

According to still further embodiments, there is provided a method and/or a computer-readable memory medium for the above.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate

DETAILED DESCRIPTION

Figure 1A:
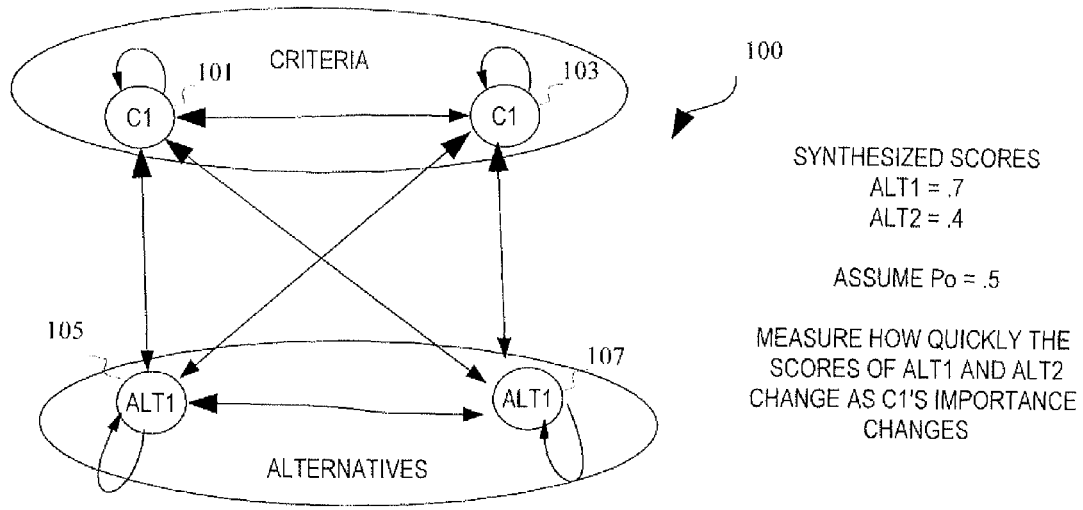
FIG. 1A is a diagram illustrating a network used with a measurement of marginal influence of a node in an ANP weighted supermatrix.

In overview, the present disclosure concerns computers, computer networks and computer systems, such as an intranet, local area network, distributed network, or the like having a capability of measuring properties of decision models. Such computer networks and computer systems may further provide services such as interacting with users, and/or evaluating modifications to a decision model. More particularly, various inventive concepts and principles are embodied in systems, devices, and methods therein related to measuring properties of an analytic network process model. It should be noted that the term device may be used interchangeably herein with computer, wireless communication unit, or the like. Examples of such devices include personal computers, general purpose computers, personal digital assistants, cellular handsets, and equivalents thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

Discerning the influence that nodes in an ANP model have on the ANP model's alternatives' scores and rankings can be an important analytic tool. That is, we wish to understand which parts of the ANP model have the most impact (or control) on our decision. To address these and other problems, we present a marginal influence analysis based on ANP row sensitivity which provides a measurement of "near term" behavior.

1 Introduction

ANP influence analysis, as described in Applicants' application titled "MEASURING SENSITIVITY OF A FACTOR IN A DECISION", Ser No. 12/646,289, filed concurrently herewith and expressly incorporated herein by reference, allows us to analyze the influence a node has on the alternative scores. To do this, we can move up the importance of each node a fixed amount and analyze how the alternative scores change (likewise for moving the importance downward). This analysis provides information about medium to long range changes in node importance affecting the alternative scores, not small changes. It is easiest to see this difficulty with a velocity analogy. If we measure that we have traveled 60 miles in the last hour that gives our average velocity at 60 mph. However that does not mean we are going 60 mph right now (we could have gone 80 mph for the first 45 minutes, and then been stuck in a traffic jam the last 15 minutes and be stopped now). If we are interested in our velocity right this minute, the average velocity over the last hour is a poor approximation. ANP influence analysis is analogous to measuring average velocity whereas ANP marginal influence is like measuring velocity this instant. ANP marginal analysis tells us how much affect nodes have on the alternative scores for small changes in the node's importance.

There is a subtlety in this measurement. Because of the nature of ANP row sensitivity our functions may not be differentiable at the point we are interested in (this will be true no matter how we parameterize the system, as long as we follow the definition of ANP row sensitivity (defined in the above-mentioned application titled "MEASURING SENSITIVITY OF A FACTOR IN A DECISION") we loose differentiability). However, we can look at the left and right derivatives (which exist), and these give us lower and upper marginal influence information.

1.1 ANP Row Sensitivity Review

The following is a brief review of the concepts involved in the above-mentioned ANP Row Sensitivity application titled "MEASURING SENSITIVITY OF A FACTOR IN A DECISION". A purpose of ANP row sensitivity is to change the numerical information for a given node in a way that is consistent with the ANP structure, and then to recalculate the alternative values (much as tree sensitivity works). We do this by having a single parameter p that is between zero and one, which represents the importance of the given node. There is a parameter value $p_0$ (called the fixed point) which represents returning the node values to the original weights. For parameter values larger than $p_0$ the importance of the node goes up, and for parameter values less than $p_0$ the importance of the node goes down. Once the parameter is set, this updates values in the weighted supermatrix (although it can also be done with the unscaled supermatrix, working by clusters instead) and re-synthesizes. There is essentially one way to do this calculation and preserve the ANP structure of the model. In the notation of that application, let W be the weighted supermatrix of a single level of our model, ANP row sensitivity constructs a family of row perturbations of W. A family of row perturbations of W is a mapping $f:[0,1] \to M_{n,n}([0,1])$ that gives a weighted supermatrix $f(p)$ for each parameter value $p \in [0,1]$. This mapping must preserve the ANP structure of our original supermatrix. The only real choice is what to make our fixed point $p_0$. Once we have chosen that, the standard formula for the family of row perturbations of row r of W preserving the ANP structure is labeled $F_{W,r,p_0}$: $[0,1] \to M_{n,n}([0,1])$ and is defined in the following way.

1. Leave trivial columns unchanged. A trivial column is defined herein as either a zero column, or a column with all zeroes except one entry that is one.

2. If $0 \le p \le p_0$ define $F_{W,r,p_0}(p)$ by scaling the $r^{th}$ row by $$\frac{p}{p_0}$$

and scaling the other entries in the columns so as to keep the matrix stochastic.

3. If $p_0 \le p \le 1$ define $F_{W,r,p_0}(p)$ by leaving alone columns of W for which $W_{r,i}=0$ and scaling all entries in the other columns, except for the entry in the $r^{th}$ row, by $$\frac{1-p}{1-p_0}$$

(and change the entry in that $r^{th}$ row so as to keep the matrix stochastic).

1.2 Concept of Marginal Influence

The idea behind marginal influence of a particular node is to change its importance in the model slightly (using ANP row sensitivity), calculate the new alternative scores, and then calculate the change in the scores over the amount the node's importance was changed by. Thus, if the marginal influence of node 1 to alt 1 is 1.5 that means a 1 percent change in node 1's importance induces a 1.5 percent change alt 1's score.

Loosely, marginal influence can be thought of as the derivative of the alternative scores with respect to the importance of the given node. Thus marginal influence can tell us the impact of a node on the alternative scores. In particular, it can tell us how much small changes in information about the importance of the node affect the alternative scores. Or, we can think of it as telling us how much small numerical errors related to the given node affect the alternative scores, thus telling us where we need to really focus on being absolutely sure of our numerical inputs.

2 Marginal Influence

In this section we define the formula for marginal influence, as well as a method for selectively approximating it on modern computer hardware.

2.1 Notation and Definitions

Definition 1 (Ranking) Let A be an ANP model with a alternatives ordered. We can use the following notation for standard calculated values of the model.

$s_{A,i}$ synthesized score for alternative i $r_{A,i}$ ranking of alternative i where 1=best, 2=second best, etc.

Definition 2 (Family of ANP models induced by row perturbations). Let A be an ANP model, W be the weighted supermatrix of a single level of the ANP model A (of dimensions n×n) and let W(p) be a family of row perturbations of row $1 \le r \le n$ of W. We can think of this as inducing a family of ANP models, which we denote by A(p). For the synthesized score of alternative i in the ANP model A(p) we write either $s_{A(p),i}$ or if the original model and family is understood from context we write instead $s_i(p)$.

If we wish to emphasize that we have a family of row perturbations of row r we write instead $s_{r,i}(p)$.

2.2 Marginal Influence Definition

Marginal influence is essentially the derivative of the $s_i(p)$ at the fixed point $p_0$. There is a problem with this though. The derivative of $s_i(p)$ does not exist at $p_0$. However the left and right derivatives do exist. The reason for this is that $p_0$ is where we change our rules of which ANP ratios we preserve. Thus we have an upper and lower marginal influence.

Definition 3 (Marginal influence). Let A be an ANP model, W be the weighted supermatrix of a single level of it (of dimensions n×n) and let W(p) be a family of row perturbations of row $1 \le r \le n$ of W. We can think of this as inducing a family of ANP models, which we denote by A(p). Let A have a alternatives and let $1 \le i \le a$. We define the upper marginal influence of node r on alternative i to be $$s'^{+}_{r,i} = \lim_{h \to 0+} \frac{s_{r,i}(p_0+h) - s_{r,i}(p_0)}{h}.$$

Similarly the lower marginal influence of node r on alternative i is $$s'^{-}_{r,i} = \lim_{h \to 0-} \frac{s_{r,i}(p_0+h) - s_{r,i}(p_0)}{h}.$$

The total upper marginal influence vector $s'_r{}^+$ has a components, the $i^{th}$ component of which is $s'_{r,i}{}^+$. Similarly the total lower marginal influence vector is $s'_r{}^-$. Lastly the total upper (respectively lower) marginal influence is the length of the vector $s'_r{}^+$ (respectively $s'_r{}^+$) using the standard Euclidean metric and is denoted by $\|s'_r{}^+\|$ (respectively $\|s'_r{}^-\|$).

Note 1. The above definitions are taking a right (or left) derivative of $s_{r,i}(p)$ and evaluating it at $p=p_0$.

2.3 How to Compute Effectively

Due to the complicated nature of limit matrix calculations, if we take the h in the definitions of marginal influence too close to zero, round off errors can complicate the calculation. Thus the standard method of calculating limits (plugging in values closer and closer to the limit value) may not always yield the correct results. In addition, the process of plugging in values closer and closer to the limit value leads to many synthesis calculations, which can be time consumptive for large models. For these reasons any approach to calculating marginal influence needs to have more than the standard technique for limits at its disposal.

An alternate method of computing a limit is simply to fix a number close to the limit value to plug in, and take the result as the limit value. Clearly this result may not be a good approximation (nonetheless if we choose a value sufficiently close to the limit value we can expect a reasonable approximation).

However, we have to balance that against round off error considerations. It is also advisable to calculate for at least one other value of h, to compare how much difference there is between our first value, and the new value (which gives us some idea of the quality of our approximation). In our case we have the limit as the parameter goes to 0. If we pick a value of h (close to zero) to plugin, plugging the value of h/2 to compare with is a reasonable sanity check.

3 Examples

In the following examples, software was used to generate the table of values describing the marginal influence of the nodes. In each case, wherever parameters are needed for the software they are described.

3.1 4node2.mod

This model is a simple representative model with two clusters (a criteria cluster and alternatives cluster) each of which contain two nodes (two criteria "A" and "B" and two alternatives "1" and "2"). All nodes are connected to one another with pairwise comparison data inputted.

A few notes about the data in this table, Table 1. The first row (labeled "Original") tells the scores of the alternatives in the model originally. The rest of the rows tell marginal influence information. The first column tells the node whose marginal influence we are calculating (with :upper meaning the upper marginal influence of that node, and likewise for :lower). The "Total" column means the total marginal influence. The column marked $$"\frac{d}{dp} Alt_1"$$

is the marginal influence on the alternative "1". Likewise for the column $$"\frac{d}{dp} Alt_2".$$

The "Param" column is the parameter value used for the second point in approximating the derivative (the other point used is always p=0.5). The final column is the error in approximating the derivative. This is found by comparing the approximations for smaller values of h.

TABLE 1

| Node | Total | $\frac{d}{dp}$ Alt 1 | $\frac{d}{dp}$ Alt 2 | Param | Calc Err |
|---|---|---|---|---|---|
| Original | 0.000 | 0.39 | 0.61 | 0.500000 | 0.00000 |
| A:upper | 1.031 | 0.73 | −0.73 | 0.500500 | 0.00019 |
| B:upper | 0.966 | −0.68 | 0.68 | 0.500500 | 0.00005 |
| 1:upper | 3.470 | 2.45 | −2.45 | 0.500125 | 0.00075 |
| 2:upper | 2.347 | −1.66 | 1.66 | 0.500125 | 0.00057 |
| A:lower | 0.307 | 0.22 | −0.22 | 0.499750 | 0.00002 |
| B:lower | 0.287 | −0.2 | 0.2 | 0.499750 | 0.00001 |
| 1:lower | 0.817 | 0.58 | −0.58 | 0.499750 | 0.00008 |
| 2:lower | 0.949 | −0.67 | 0.67 | 0.499750 | 0.00018 |

It is interesting to compare these results to the maximum percent change scores for the alternatives which can be calculated for this model. In the case of maximum percent change scores, the best scoring non-alternative in the model was "B", meaning that "B" gives rise to the largest change when the parameter value is pushed upwards to p=0.9. However, looking at the marginal information, it turns out the "A" is the non-alternative with the most marginal influence. This means that "A" has a lot of influence initially, however asp pushes outward to larger values "B" begins to catch up.

3.2 BigBurger.mod

The initial values for the standard BigBurger model are found in the conventional sample models of SuperDecisions. The first row in Table 2 is the original synthesized values. The rest of the rows are the marginal influence for the given node (with upper or lower denoted after the node name). The "Total" column is the total marginal influence. The rest of the columns are the marginal influence on the alternatives "1 MacDonald's", "2 Burger King", and "3 Wendy's" respectively. For all of the rows shown, the parameter value was p=0.5005 and the errors are comparable to the previous example (they have been omitted in the interest of space). Finally notice that we only include the top few scorers and we have ordered them based on total marginal influence.

TABLE 2

| Node | Total | $\frac{d}{dp}$ MacDon | $\frac{d}{dp}$ BK | $\frac{d}{dp}$ Wendy |
|---|---|---|---|---|
| Original | 0.0000 | 0.63 | 0.23 | 0.13 |
| 1 Subs:upper | 0.5795 | −0.46 | 0.14 | 0.32 |
| 5 Drive Thru:upper | 0.3991 | 0.32 | −0.23 | −0.09 |
| 2 Recycling:upper | 0.2601 | 0.21 | −0.1 | −0.11 |
| 1 White Collar:upper | 0.2543 | 0.21 | −0.07 | −0.13 |
| 3 Parking:upper | 0.2473 | 0.2 | −0.09 | −0.11 |
| 1 Personnel:upper | 0.2280 | 0.19 | −0.09 | −0.1 |
| 2 Food Hygiene:upper | 0.2176 | 0.18 | −0.08 | −0.09 |
| 2 Seating:upper | 0.2108 | 0.17 | −0.07 | −0.1 |
| 3 Waste Disposal:upper | 0.2060 | 0.17 | −0.07 | −0.1 |
| 1 Nutrition:upper | 0.1946 | 0.16 | −0.05 | −0.11 |
| 3 Students:upper | 0.1940 | 0.15 | −0.04 | −0.11 |
| 2 Blue Collar:upper | 0.1915 | 0.15 | −0.03 | −0.11 |
| 4 Families:upper | 0.1814 | 0.13 | −0.01 | −0.12 |
| 3 Location:upper | 0.1733 | 0.14 | −0.04 | −0.09 |
| 1 Price:upper | 0.1629 | 0.13 | −0.02 | −0.1 |
| 4 Over Packaging:upper | 0.1553 | 0.12 | −0.04 | −0.08 |
| 2 Product:upper | 0.1531 | 0.12 | −0.03 | −0.09 |
| 2 Chicken:upper | 0.1523 | 0.12 | −0.07 | −0.05 |
| 4 Deals:upper | 0.1329 | 0.1 | −0.02 | −0.08 |
| 5 Chinese:upper | 0.1086 | 0.08 | −0.02 | −0.07 |
| 3 Pizza:upper | 0.1056 | 0.08 | −0.02 | −0.06 |
| 3 Site Hygiene:upper | 0.0813 | 0.07 | −0.02 | −0.04 |
| 7 Diners:upper | 0.0670 | 0 | 0.05 | −0.05 |

It is interesting to note that the ordering according to marginal influence differs after the top two scorers, compared with the influence score calculated as percent change for this model.

3.3 DiLeo&Tucker Beer Market Share

This is a model taken from the Saaty's class on ANP. The model is designed to predict market share of various beer manufacturers. The data in Table 3 is similarly formatted to the previous examples.

TABLE 3

| Node | Total | $\frac{d}{dp}$ Busch | $\frac{d}{dp}$ Coors | $\frac{d}{dp}$ Other | $\frac{d}{dp}$ Miller |
|---|---|---|---|---|---|
| Original | 0.000 | 0.43 | 0.16 | 0.2 | 0.2 |
| Quality:upper | 1.385 | −0.96 | 0.28 | 0.93 | −0.25 |
| Ad Spending:upper | 0.833 | 0.66 | −0.17 | −0.48 | 0 |
| Customers:upper | 0.818 | −0.57 | 0.15 | 0.55 | −0.14 |
| Availability:upper | 0.564 | −0.05 | 0.05 | −0.39 | 0.4 |
| Price:upper | 0.557 | −0.46 | 0.13 | 0.28 | 0.04 |
| Ad Spending:lower | 0.486 | 0.4 | −0.1 | −0.26 | −0.04 |
| Freq of Ads:upper | 0.214 | 0.16 | −0.04 | −0.13 | 0.02 |
| Creat. Of Ads:upper | 0.191 | 0.13 | −0.04 | −0.13 | 0.04 |
| Brand Recog:upper | 0.164 | 0.11 | −0.03 | −0.11 | 0.03 |
| Customers:lower | 0.144 | −0.1 | 0.03 | 0.1 | −0.03 |

TABLE 3-continued

| Node | Total | $\frac{d}{dp}$ Busch | $\frac{d}{dp}$ Coors | $\frac{d}{dp}$ Other | $\frac{d}{dp}$ Miller |
|---|---|---|---|---|---|
| Style:upper | 0.136 | −0.09 | −0.03 | 0.1 | 0.01 |
| Appeal:upper | 0.134 | −0.09 | 0 | 0.1 | −0.01 |
| Quality:lower | 0.132 | −0.09 | 0.03 | 0.09 | −0.02 |

It is useful to compare these marginal influence results to the results calculating how rank is influenced. The top scorer remains the same, however there is a bit of shuffling of the nodes after that point.

Referring now to FIG. 1A, a diagram illustrating a network used with a measurement of marginal influence of a node in an ANP weighted supermatrix. Also, reference will be made to FIG. 1B, a block diagram used for explaining FIG. 1A. In FIG. 1A, there are illustrated criteria C1 and C2 101, 103, and alternatives ALT1 and ALT2 105, 107, both in an ANP network 100.

A goal in the illustrated example is to measure how quickly the scores of ALT1 and ALT 2 105, 107 changes as the importance of node C1 101 changes. Assume that the initial synthesized scores in this example are ALT1=0.7 and ALT2=0.4, which are values which were calculated from input to the decision model 100, according to known techniques.

To measure how fast the scores change, we use ANP row sensitivity on the row for criteria C1 and move values of p close and close to $p_0$, calculating (for each value of p) the change in alternative score (from the start value) over the change in p (from $p_0$). To be slightly more specific, move p closer to $p_0$ from above to calculate upper marginal influence, and move p closer to $p_0$ from below for lower marginal influence.

Figure 1B:
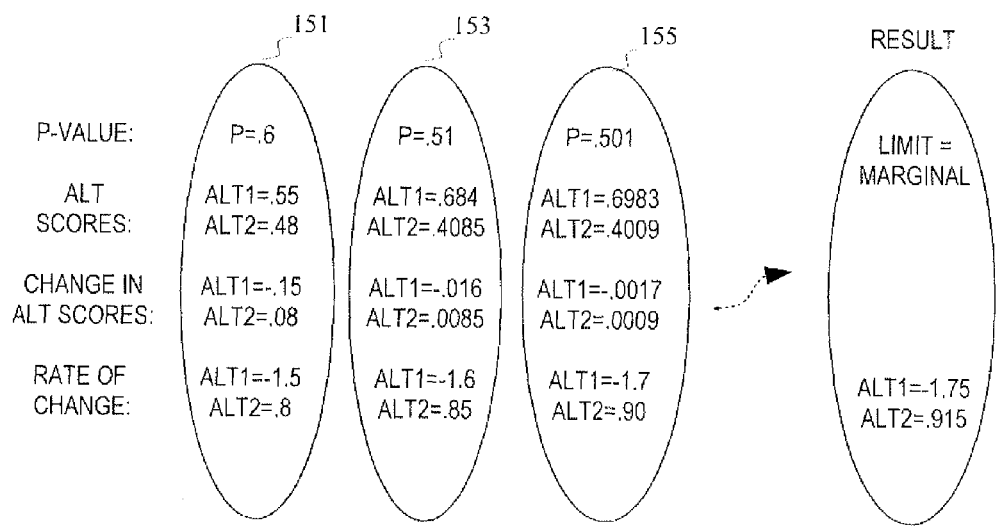
FIG. 1B is a block diagram used for explaining FIG. 1A.

For simplicity in this example assume that $p_0$=0.5. As shown in FIG. 1B, as the value of p approaches $p_0$, the following are calculated: synthesized alternative scores for ALT1 and ALT2 using ANP row sensitivity on C1, the changes in the alternative scores for ALT1 and ALT2, and the rate of change in alternative scores for ALT1 and ALT2. The result of the marginal influence measurement for C1 is that ALT1 is measured with a rate of change of −1.75, and ALT2 is measured with a rate of change of 0.915. The marginal influence is an instantaneous rate of change. We calculate an average rate of change over shorter and shorter intervals, as shown in FIG. 1B. (The difference of the P-value from 0.5 is 0.1, 0.01, 0.001, hence, shorter and shorter intervals as the P-value approaches 0.5). In each of these three instances here, we compare the currently calculated rate of change to the previously calculated rate of change. We see how far away that is from the previous set of values. We compare the current rate of change to the previous rate of change, for ALT1 it is 0.1 (−1.5 to −1.6) for group 151 to 153, 0.1 (−1.6 to −1.7) for group 153 to 155, etc. Eventually the differences between the average rates of change are sufficiently small so that the average rate of change is sufficiently close to the limit, i.e., within a pre-determined error amount limit (e.g., 0.0005), so as to be the instantaneous rate of change.

We should mention that the limit can also be taken from the lower approach, in this illustrated example, e.g., P-values of p=0.4, 0.49, 0.499, etc. That would arrive at the lower marginal influence. The lower limit will be different from the upper limit, because the proportionality of the ANP model is maintained.

Figure 2:
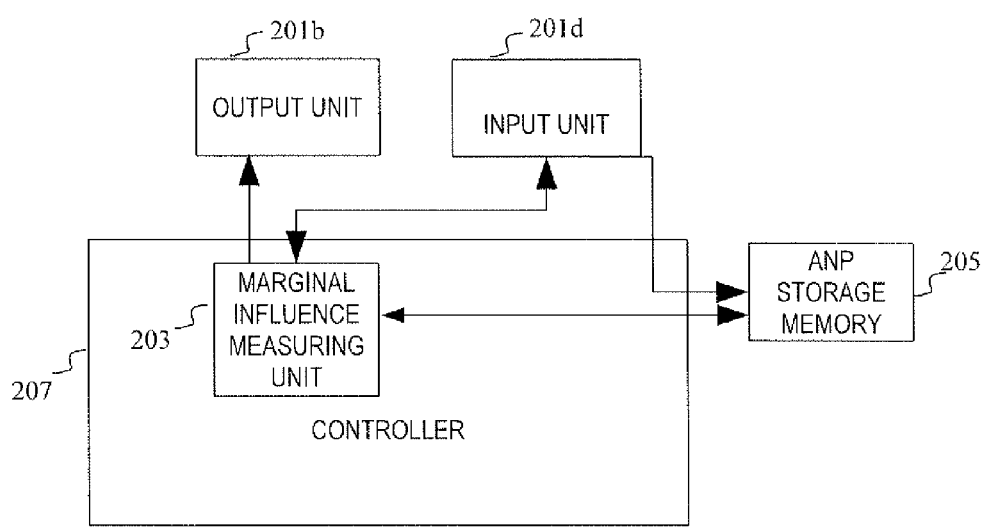
FIG. 2 a block diagram illustrating a system for measuring marginal influence.

Referring now to FIG. 2, block diagram illustrating a system for measuring marginal influence will be discussed and described. In the illustrated embodiment, there is provided a controller 207 with a marginal influence measuring unit 203. The marginal influence measuring unit 203 can access an ANP storage memory 205, in order to measure marginal influence of nodes in the ANP model in the ANP storage memory 205. Users can interact with the system via an output unit 201b and/or an input unit 201d communicating with the marginal influence measuring unit 203. Also, users can interact via an input unit 201d with the ANP model stored in the ANP storage memory 205, for example where votes for the ANP model (which can represent votes) are input via the input unit 201d. The output unit 201b and/or input unit 201d can be remote or local.

Figure 3:
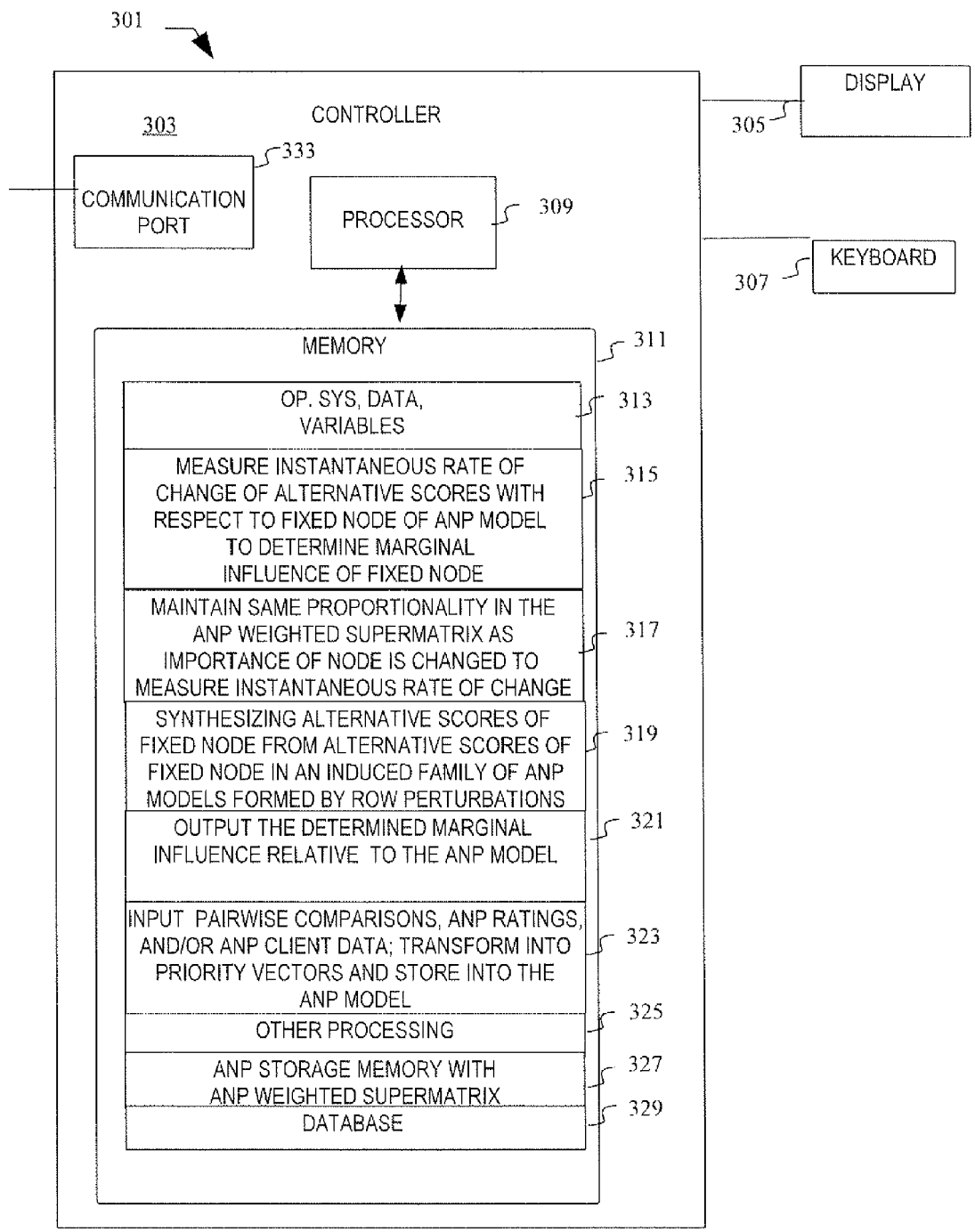
FIG. 3 is a block diagram illustrating portions of an exemplary computer.

Referring now to FIG. 3, a block diagram illustrating portions of an exemplary computer will be discussed and described. The computer 301 may include an optional communication port 333 for communication with an external device (not illustrated), a processor 309, a memory 311, a display 305, and/or a user input device 307, e.g., a keyboard (as illustrated), trackball, mouse, or known voting device. Many of the other elements of a computer are omitted but will be well understood to one of skill in the art.

The processor 309 may comprise one or more microprocessors and/or one or more digital signal processors. The memory 311 may be coupled to the processor 309 and may comprise a read-only memory (ROM), a random-access memory (RAM), a programmable ROM (PROM), and/or an electrically erasable read-only memory (EEPROM). The memory 311 may include multiple memory locations for storing, among other things, an operating system, data and variables 313 for programs executed by the processor 309; computer programs for causing the processor to operate in connection with various functions such as to measure 315 instantaneous rate of change of alternative scores with respect to a fixed node of the ANP model to determine a marginal influence of the fixed node, to maintain 317 a same proportionality in the ANP weighted supermatrix as the importance of the node is changed to measure the instantaneous rate of change, to synthesize 319 alternative scores of the fixed node from the alternative scores of the fixed node in an induced family of ANP models formed by row perturbations, to output 321 the determined marginal influence relative to the ANP model, to input 323 pairwise comparisons, ANP ratings, and/or ANP client data, and transform the data into priority vectors and store into an ANP storage memory 327, and/or other processing 325; the ANP storage memory 327 in which the ANP weighted supermatrix is stored; and a database 329 for other information used by the processor 309. The computer programs may be stored, for example, in ROM or PROM and may direct the processor 309 in controlling the operation of the computer 301.

The user may invoke functions accessible through the user input device 307. The user input device 307 may comprise one or more of various known input devices, such as a keypad, a computer mouse, a touchpad, a touch screen, a trackball, a keyboard and/or a button device configured to register votes. Responsive to signaling received from the user input device 307, in accordance with instructions stored in memory 311, or automatically upon receipt of certain information via the communication port 333, the processor 309 may direct information in storage or information received by the user input device to be processed by the instructions stored in memory 311.

The display 305 may present information to the user by way of a text and/or image display 305 upon which information may be displayed. The display 305 may present information to the user by way of an available liquid crystal display (LCD), plasma display, video projector, light emitting diode (LED) or organic LED display, cathode ray tube, or other visual display; and/or by way of a conventional audible device (such as a speaker, not illustrated) for playing out audible messages.

The processor 309 can be programmed to measure 315 instantaneous rate of change of alternative scores with respect to a fixed node of the ANP model to determine a marginal influence of the fixed node. This has been discussed in detail above.

The processor 309 can be programmed to maintain 317 the same proportionality in the ANP weighted supermatrix as the importance of the fixed node is changed to measure the instantaneous rate of change. The same proportionality is maintained while preserving the ANP structure. The proportionality is maintained throughout the measurement of the instantaneous rate of change 315.

To preserve the ANP structure, connections are not created or destroyed. That is, an entry in the matrix is not changed to or from zero, since a non-zero value represents a connection whereas a zero value indicates that there is no connection.

Preserving proportionality is a more difficult consideration. So, the question is, if I am making changes to this row, what is the most proportionality I can keep? Hence, maintaining proportionality is the more difficult and/or subtle problem for figuring out how this should behave.

No connections in the ANP network are created or destroyed by doing this present process. If a priority is zero, then there is no connection to another node. If that is ever changed from zero to something, then a connection has been created by the system, which is bad because the user did not create the connection. The change from zero changes the ANP structure because it creates a connection that was not there originally. Likewise, taking a non-zero value (which is a connection) and changing it to zero deletes a connection which was there. An embodiment of the present process does not create or destroy connections.

Now consider how to preserve as much of proportionality as possible, that is, preserving the ratios of the numbers involved in the ANP model as possible. If, in the original ANP model, e.g., node A is twice as good as node B, that proportionality is maintained as much as possible. It cannot be kept exactly, because that means nothing can be changed. However, by doing row sensitivity, you will break a few proportionalities. There is no choice. But, the other proportionalities you want to keep.

That is, to keep proportionality while changing a node to test that node, you are attempting to maintain proportionality for the other non-changed nodes. Proportionality involves a node and a with-respect-to, and you want to preserve those proportionalities as much as possible.

While maintaining proportionality, trivial columns are not changed. That is, an entry in the ANP model that is not connected, stays that way; or something that is only connected to the node where row sensitivity is occurring, stays that way. While maintaining proportionality, connections are not created, and connections are not destroyed. To summarize, in order to preserve ANP structure, connections are not created or destroyed.

The processor 309 can be programmed to synthesize 319 alternative scores of the fixed node from the alternative scores of the fixed node in an induced family of ANP models formed by row perturbations. This was previously discussed in detail, and will not be repeated here.

The processor 309 can be programmed to output 321 the determined marginal influence relative to the ANP model. That is, an indication of the determined marginal influence can be visually displayed for a user. For example, a chart can be provided showing the marginal influence of one or more nodes in the ANP model. By such a measurement, a user can identify the most (or least) sensitive or influential nodes so as to further refine or interact with the ANP model with respect to those nodes.

The processor 309 can be programmed to interact with the user so as to input 323 new or modified pairwise comparisons, ANP ratings, and/or ANP client data, and transform the data into priority vectors and store into the ANP model. As with traditional ANP, alternatives can be pairwise compared. The data which is input can be transformed into priority vectors, as with traditional ANP, and matrix transformations can be prepared. The result can be stored into the ANP, such as the ANP storage memory 327 with ANP weighted supermatrix in the memory 311.

Optionally, other components may be incorporated in the computer 301 to produce other actions. For example, a user can interface with the computer 301, via a known user interface such as OUTLOOK software, WINDOWS software, and/or other commercially available interfaces. Further, the computer 301 can send and receive transmissions via known networking applications operating with the communication port 333 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the synthesizer can be omitted. In addition, some of these functions may be performed predominantly or entirely on one or more remote computers (not illustrated); and therefore such functions can be reduced or omitted from the processor 409 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The ANP storage memory 327 is illustrated as being part of memory 311 stored locally on the controller 303. It will be appreciated that the ANP storage memory 327 can be stored remotely, for example, accessed via the communication port 333 or similar.

The computer 301 can include one or more of the following, not illustrated: a floppy disk drive, an optical drive, a hard disk drive, a removable USB drive, and/or a CD ROM or digital video/versatile disk, which can be internal or external. The number and type of drives can vary, as is typical with different configurations, and may be omitted. Instructions that are executed by the processor 309 and/or an ANP model can be obtained, for example, from the drive, via the communication port 333, or via the memory 311.

Figure 4:
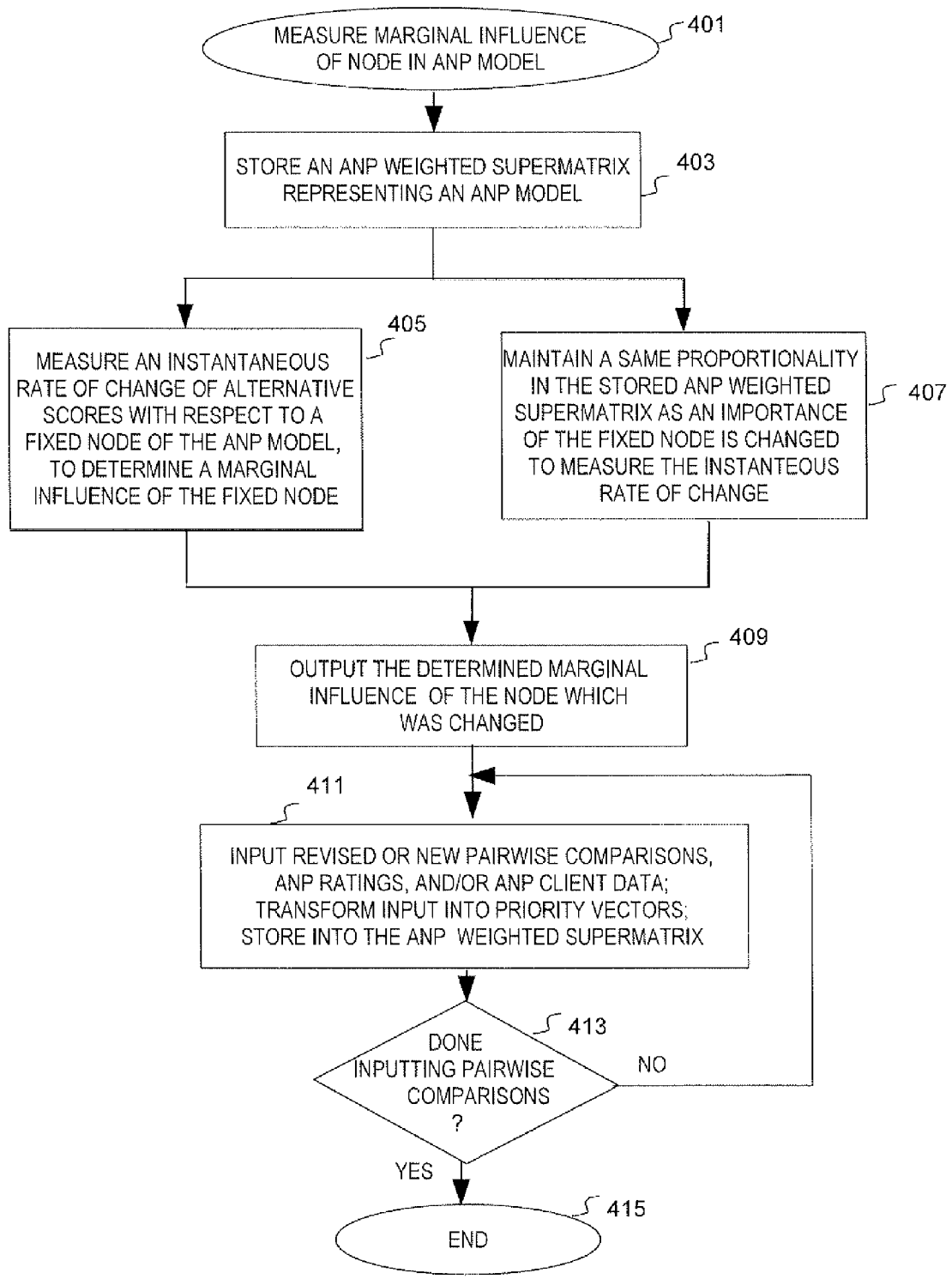
FIG. 4 is a flow chart illustrating a procedure to measure marginal influence of a node in an ANP model.

Referring now to FIG. 4 is a flow chart illustrating a procedure 401 to measure marginal influence of a node in an ANP model; will be discussed and described. The procedure can advantageously be implemented on, for example, a processor of a controller, described in connection with FIG. 3 or other apparatus appropriately arranged. In overview, the procedure 401 includes storing 403 an ANP weighted supermatrix representing an ANP model; measuring 405 an instantaneous rate of change of alternative scores with respect to one fixed node of the ANP model, to determine a marginal influence of the fixed node; and throughout the process of measuring, maintaining 407 a same proportionality of the stored ANP weighted supermatrix. The procedure 401 can also include outputting 409 the determined marginal influence of the node which was changed. Furthermore, the procedure 401 can include inputting 411 ANP data (e.g., pairwise comparisons) and storing it into the ANP weighted supermatrix. The inputting 411 can continue until, for example, the user is done 413 inputting, e.g., pairwise comparisons, and then can end 415. Although not illustrated, the user can repeat to the top of the procedure 401, to measure the marginal influence of a node in the current ANP model. Each of these is explained in more detail below, except that details which have been previously discussed may not be repeated below.

The procedure 401 can include storing 403 an ANP weighted supermatrix representing an ANP model. Before storing the ANP weighted supermatrix, values in the ANP weighted supermatrix can be obtained from an ANP model, for example, by inputting pairwise comparisons and creating an ANP weighted supermatrix therefrom, through various known techniques.

The procedure 401 can include measuring 405 an instantaneous rate of change of alternative scores with respect to one fixed node of the ANP model, to determine a marginal influence of the fixed node. This has been discussed above in detail, and will not be repeated here.

Figure 5:
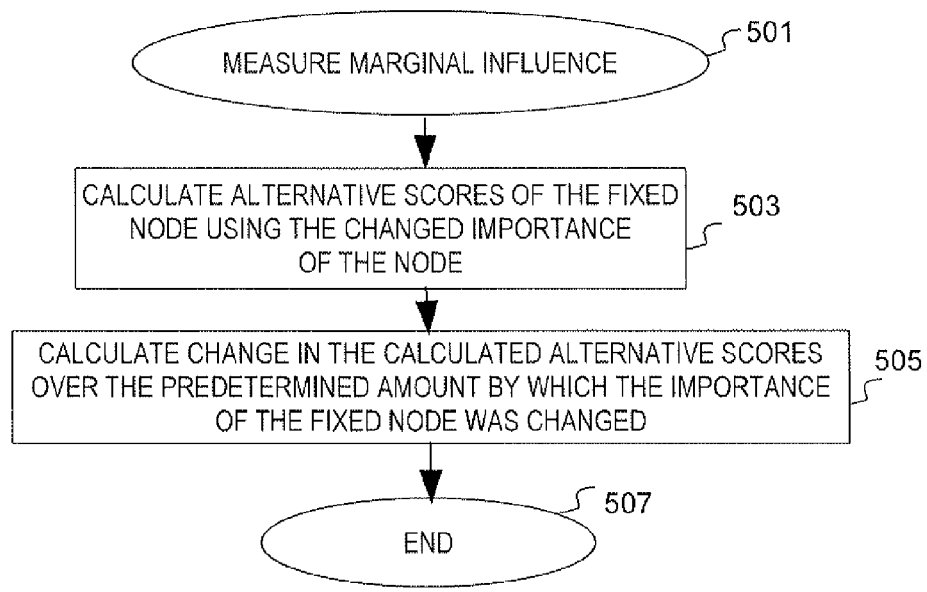
FIG. 5 is a flow chart illustrating a procedure to measure marginal influence.

The procedure 401 can include, throughout the process of measuring, maintaining 407 a same proportionality of the stored ANP weighted supermatrix. This has been discussed above in detail. Although the priorities are perturbed, the proportionality in the ANP weighted supermatrix of the unperturbed nodes to each other is maintained. The measuring 405 and the maintaining of proportionality 407 are illustrated in parallel since they both are performed simultaneously, so that even as the measurements are taken by changing the importance of the fixed node, the proportionality of the stored ANP weighted supermatrix is maintained. FIG. 5 illustrates more detail of the measuring 405.

The procedure 401 can also include outputting 409 the determined marginal influence of the node which was changed. For example, the calculated value of the marginal influence can be output. The value can be shown as part of a representation of a supermatrix, as part of a conventional bar graph, as part of another graph, and/or a standalone value. Similarly, the marginal influence can be output in a visual representation. A user can make a decision regarding changes to the ANP model, for example based on the marginal influence of the node which is output.

Furthermore, the procedure 401 can include inputting 411 ANP data (e.g., pairwise comparisons) and storing it into the ANP weighted supermatrix. The inputting 411 can continue until, for example, the user is done 413 inputting, e.g., pairwise comparisons. The input of revised or new pairwise comparisons, rating, and/or ANP client data into the ANP weighted supermatrix can be done in accordance with known techniques for modifying data in an ANP, such as by interacting with a user. The process 401 can input 411 pairwise comparisons, ANP ratings, and/or ANP client data. The user interface side of inputting pairwise comparisons, ratings, or client data can be performed according to known techniques. For example, the process 401 can query the user to input, "with respect to opportunities, which is more important: social or political?" to input values of a pairwise comparison of the social and political opportunities nodes. Also, the process 401 can transform the input values into priority vectors in accordance with known techniques. Further, the process 401 can store the new or modified input values and the priority vectors into the ANP model. The process can loop if not done 413 inputting pairwise comparisons, or can finish at an end 415.

Referring now to FIG. 5, a flow chart illustrating a procedure 501 to measure marginal influence will be discussed and described. In overview, the procedure 501 will calculate 503 alternative scores of the fixed node using the changed importance of the node, and calculate 505 the change in the calculated alternative scores over the predetermined amount by which the importance of the fixed node was changed. These have been described in great detail above.

More particularly, the measurement procedure 501 can calculate 503 alternative scores when doing row sensitivity on the fixed node using the changed importance of the node. We use ANP row sensitivity on the row for a fixed node with values of p approaching a limit $p_0$, and calculate synthesized alternatives scores.

The measurement procedure 501 can calculate 505 the change in the calculated alternative scores over the predetermined amount by which the importance of the fixed node was changed. We can calculate (for each value of p) the change in the synthesized alternative scores (from the start value). The value of the change can further be taken over the change in p (from $p_0$). The change in synthesized alternative scores over the change in p can provide the measurement of the marginal influence, for the alternatives for the node.

Figure 6:
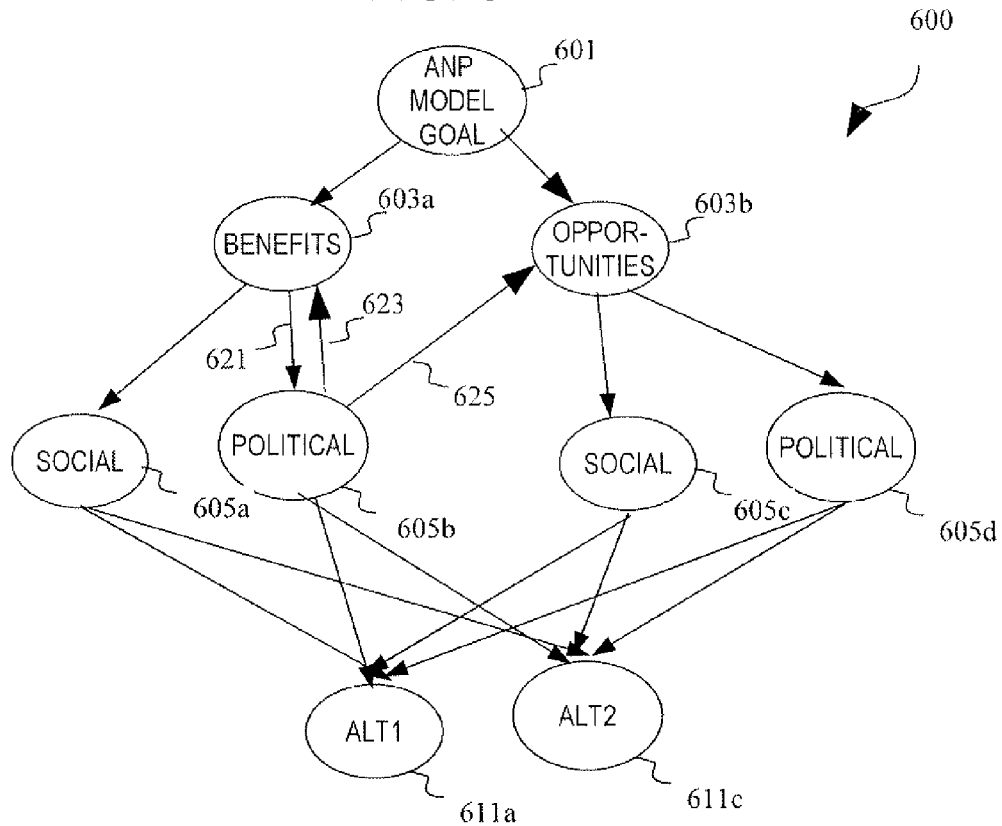
FIG. 6 is a diagram illustrating a simplified representation of an ANP model.

Referring now to FIG. 6, a diagram illustrating a simplified representation of an ANP model will be discussed and described. The illustration is simplified for ease of discussion. In the ANP model, there are conventionally provided control criteria that are benefits, costs, opportunities, and risks (commonly abbreviated BOCR). At the top of the ANP model 600, there is provided an ANP model goal 601, benefits 603a and opportunities 603b. (The usual costs and risks are not shown.) The benefits 603a is a node that includes a one way directional link from the benefits 603a node to the social benefits node 605a and the political benefits node 605b. The opportunities 603b is a node that includes a one way directional link from the opportunities 603b node to the social opportunities node 605c and the political opportunities node 605d. The political benefits node 605b includes a one way directional connection to the benefits node 603a and the opportunities node 603b. Each of the social benefits node 605a, the political benefits node 605b, the social opportunities node 605c and the political opportunities node 605d includes a separate one-way directional connection to alternative 1 611a and alternative 2 611c.

In a conventional ANP model, the connection defines how important the destination node is to the source node. Hence, a connection is directional, that is, it has a from direction and a to direction. For example, a connection from the conventional ANP model goal 601 to the benefits node 603a means that the user can define how important benefits are to the goal.

One of skill in this art will know that the ANP model can be represented as a matrix (or series of matrices), where a node is represented as a row in the matrix.

The designations in the following list are defined and expressly used herein as would be understood to one of skill in the ANP art, and not according to a general dictionary, whether singular or plural: "priority," "node", "importance" (or "important"), "sensitivity," "pairwise comparison", "ANP ratings" (or "ratings"), "ANP client data", "priority vectors", "judgment of priority," "ANP alternatives" (or "alternatives"), "criteria", "weight," "cluster," "local," "global," "synthesize." This list is not exhaustive and does not imply that a term not on this list can be interpreted according to a general dictionary instead of according to an understood ANP meaning. Some of these are further explained below for the reader's convenience.

"Pairwise comparison." The point of a pairwise comparison set is to arrive at the priorities of a group of things. These things may be criteria (so-called "alternatives" in the traditional ANP sense), or ratings scales. In a classic example of doing pairwise comparisons, one can answer the question, "how many times better is X than Y" for all X and Y being compared.

"ANP Ratings." If one thinks of a single column of the conventional ANP's rating system as conventionally represented in a matrix, its point is to assign ideal priorities to the alternatives (with respect to a criteria). The ratings prioritize alternatives in a set of alternatives. In a classic example of doing ANP ratings, one first sets up ratings words like "High", "Medium" and "Low", and gives scores to those words; then each of the things being rated is assigned a "High", "Medium" or "Low."

"ANP client data." ANP client data are data that represent real world values. For example, in a decision about an automobile purchase, ANP client data could be miles per gallon, number of passengers, headroom, cubic size of storage, etc.

The term "analytic network process" ("ANP") model, sometimes referred to as an ANP network model, an ANP network or similar, is defined herein to refer to a form of an analytic hierarchy process (AHP) in which values for higher level elements are affected by lower level elements and take the dependency of the lower level elements into account; further in the ANP model, the importance of the criteria determines the importance of the alternatives (as in an AHP); the importance of the alternatives themselves determines the importance of the criteria; further, the ANP model additionally has influence flowing between non-downward elements (in comparison to a conventional AHP model, in which influence flows only downwards); further the ANP model is a network, that is not a top-down-tree, of priorities and alternative choices. The terms "criteria", and "alternatives" are understood to those of skill in the AHP art. An ANP is further discussed in, e.g., Saaty, T. L. (2001) *Decision Making with Dependence and Feedback: the Analytic Network Process*, $2^{nd}$ edition.

The term "ANP weighted supermatrix" is defined as the supermatrix which is created from the ANP model, and which has been weighted, in accordance with ANP theory, and variations, extensions, and/or evolutions of such ANP theory. The ANP supermatrix is understood to be represented in rows and columns.

The above is sometimes described in terms of a single user, for ease of understanding and illustration. However, it is understood that multiple users can be accommodated in various embodiments. For example, multiple users each can input pairwise comparisons.

Furthermore, the devices of interest may include, without being exhaustive, general purpose computers, specially programmed special purpose computers, personal computers, distributed computer systems, calculators, handheld computers, keypads, laptop/notebook computers, mini computers, mainframes, super computers, personal digital assistants, communication devices, any of which can be referred to as a "computer", as well as networked combinations of the same, and the like, although other examples are possible as will be appreciated by one of skill in the art, any of which can be referred to as a "computer-implemented system."

One or more embodiments may rely on the integration of various components including, as appropriate and/or if desired, hardware and software servers, database engines, and/or other content providers. One or more embodiments may be connected over a network, for example the Internet, an intranet, a wide area network (WAN), a local area network (LAN), or even on a single computer system. Moreover, portions can be distributed over one or more computers, and some functions may be distributed to other hardware, in accordance with one or more embodiments.

Any presently available or future developed computer software language and/or hardware components can be employed in various embodiments. For example, at least some of the functionality discussed above could be implemented using C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus comprising:
an analytic network process (ANP) storage memory that stores an ANP weighted supermatrix representing an ANP model; and
a processor in communication with the ANP storage memory, the processor being configured to facilitate
measuring an instantaneous rate of change of alternative scores throughout the ANP model with respect to a fixed node of the ANP model, to determine a marginal influence of the fixed node, the marginal influence indicates how important the fixed node is to the alternative scores; and
maintaining a same proportionality in the stored ANP weighted supermatrix, while inducing a family of ANP models formed by row perturbation changes throughout a same row within the ANP supermatrix by predetermined amounts of an ANP-row-family-parameter, as an importance of the fixed node is changed for the measuring of the instantaneous rate of change of the alternative scores throughout the ANP model.

2. The apparatus of claim 1, the measuring of the instantaneous rate of change comprising:
calculating the alternative scores of the fixed node using a changed importance of the node; and calculating the change in the calculated alternative scores over an amount by which the importance of the fixed node was changed.

3. The apparatus of claim 1, the marginal influence being measured as a length of a vector of the change in the alternative scores.

4. The apparatus of claim 1, further comprising synthesizing the alternative scores of the fixed node from the alternative scores of the fixed node in the induced family of ANP models formed by row perturbations of the fixed node in the stored ANP weighted supermatrix.

5. The apparatus of claim 1, the marginal influence being determined consistent with at least one of the formulas:

an upper marginal influence of node r on alternative i is $$s'^{+}_{r,i} = \lim_{h \to 0+} \frac{s_{r,i}(p_0 + h) - s_{r,i}(p_0)}{h};$$

and
a lower marginal influence of node r on alternative i is $$s'^{-}_{r,i} = \lim_{h \to 0-} \frac{s_{r,i}(p_0 + h) - s_{r,i}(p_0)}{h};$$

where r is the fixed node,
i is the alternative which is scored,
$s'^{+}_{r}$ is a total upper marginal influence vector,
$s'^{-}_{r}$ is a total lower marginal influence vector,
h is a predetermined amount by which the importance of the fixed node was changed,
$p_0$ is a parameter value which represents returning the node importance to an original weight.

6. The apparatus of claim 1, further comprising:
an output unit in communication with the processor and configured to output, for a display to a user, the determined marginal influence.

7. The apparatus of claim 1, further comprising
an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

8. The apparatus of claim 1, wherein the measuring of the instantaneous rate of change of the alternative scores throughout the ANP model is defined to include adjusting a weight for the fixed node with respect to all of plural nodes among the ANP connecting to the fixed node.

9. A method, comprising:
storing, in an analytic network process (ANP) storage memory, an ANP weighted supermatrix representing an ANP model;
in a processor in communication with the ANP storage memory, measuring an instantaneous rate of change of alternative scores throughout the ANP model with respect to a fixed node of the ANP model, to determine a marginal influence of the fixed node, the marginal influence indicates how important the fixed node is to the alternative scores; and
maintaining a same proportionality in the stored ANP weighted supermatrix, while inducing a family of ANP models formed by row perturbation changes throughout a same row within the ANP supermatrix by predetermined amounts of an ANP-row-family-parameter, as an importance of the fixed node is changed for the measuring of the instantaneous rate of change of the alternative scores throughout the ANP model.

10. The method of claim 9, the measuring of the marginal influence comprising:
calculating the alternative scores of the fixed node using the changed importance of the node; and
calculating the change in the calculated alternative scores over the predetermined amount by which the importance of the fixed node was changed.

11. The method of claim 10, the marginal influence being measured as a length of a vector of the change in the alternative scores.

12. The method of claim 9, the alternative scores of the fixed node further being synthesized from the alternative scores of the fixed node in the induced family of ANP models formed by row perturbations of the fixed node in the stored ANP weighted supermatrix.

13. The method of claim 9, the marginal influence being measured consistently with at least one of the formulas:
an upper marginal influence of node r on alternative i is $$s'^{+}_{r,i} = \lim_{h \to 0+} \frac{s_{r,i}(p_0 + h) - s_{r,i}(p_0)}{h};$$

and
a lower marginal influence of node r on alternative i is $$s'^{-}_{r,i} = \lim_{h \to 0-} \frac{s_{r,i}(p_0 + h) - s_{r,i}(p_0)}{h};$$

where r is the fixed node,
i is the alternative which is scored,
$s'^{+}_{r}$ is a total upper marginal influence vector,
$s'^{-}_{r}$ is a total lower marginal influence vector,
h is the predetermined amount by which the importance of the fixed node was changed,
$p_0$ is a parameter value which represents returning the node importance to an original weight.

14. The method of claim 9, further comprising:
outputting, to an output unit in communication with the processor, for display to a user, the determined marginal influence.

15. The method of claim 9, further comprising
inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

16. The method of claim 9, wherein the measuring of the instantaneous rate of change of the alternative scores throughout the ANP model is defined to include adjusting a weight for the fixed node with respect to all of plural nodes among the ANP connecting to the fixed node.

17. A non-transitory computer-readable storage medium encoded with a computer executable instructions, wherein execution of said computer executable instructions by one or more processors causes a computer to perform the steps of:

storing, in an analytic network process (ANP) storage memory, an ANP weighted supermatrix representing an ANP model;

measuring an instantaneous rate of change of alternative scores throughout the ANP model with respect to a fixed node of the ANP model, to determine a marginal influence of the fixed node, the marginal influence indicates how important the fixed node is to the alternative scores; and maintaining a same proportionality in the stored ANP weighted supermatrix, while inducing a family of ANP models formed by row perturbation changes throughout a same row within the ANP supermatrix by predetermined amounts of an ANP-row-family-parameter, as an importance of the fixed node is changed for the measuring of the instantaneous rate of change of the alternative scores throughout the ANP model.

18. The computer-readable storage medium of claim 17, the measuring of the marginal influence comprising:

calculating the alternative scores of the fixed node using a changed importance of the node; and calculating the change in the calculated alternative scores over the predetermined amount by which the importance of the fixed node was changed.

19. The computer-readable storage medium of claim 18, the marginal influence being measured as a length of a vector of the change in the alternative scores.

20. The computer-readable storage medium of claim 17, further comprising synthesizing the alternative scores of the fixed node from the alternative scores of the fixed node in the induced family of ANP models formed by row perturbations of the fixed node in the stored ANP weighted supermatrix.

21. The computer-readable storage medium of claim 17, the marginal influence being measured consistently with at least one of the formulas:

an upper marginal influence of node r on alternative i is $$s'^{+}_{r,i} = \lim_{h \to 0+} \frac{s_{r,i}(p_0 + h) - s_{r,i}(p_0)}{h};$$

and a lower marginal influence of node r on alternative i is $$s'^{-}_{r,i} = \lim_{h \to 0-} \frac{s_{r,i}(p_0 + h) - s_{r,i}(p_0)}{h};$$

where r is the fixed node, i is the alternative which is scored, $s'^{+}_r$ is a total upper marginal influence vector, $s'^{-}_r$ is a total lower marginal influence vector, h is the predetermined amount by which the importance of the fixed node was changed, $p_0$ is a parameter value which represents returning the node importance to an original weight.

22. The computer readable storage medium of claim 17, further comprising instructions for:

outputting, to an output unit in communication with the processor, for display to a user, the determined marginal influence.

23. The computer readable storage medium of claim 17, further comprising instructions for:

inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

24. The computer readable storage medium of claim 17, wherein the measuring of the instantaneous rate of change of the alternative scores throughout the ANP model is defined to include adjusting a weight for the fixed node with respect to all of plural nodes among the ANP connecting to the fixed node.

* * * * *